United States Patent
Yu et al.

(10) Patent No.: US 10,627,520 B2
(45) Date of Patent: *Apr. 21, 2020

(54) METHOD AND APPARATUS FOR CONSTRUCTING REFLECTANCE MAP

(71) Applicant: Baidu Online Network Technology (Beijing) Co., Ltd., Beijing (CN)

(72) Inventors: Li Yu, Beijing (CN); Shichun Yi, Beijing (CN); Shiyu Song, Beijing (CN); Fangfang Dong, Beijing (CN); Baoqiang Xu, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 247 days.

This patent is subject to a terminal disclaimer.

(21) Appl. No.: 15/800,441

(22) Filed: Nov. 1, 2017

(65) Prior Publication Data

US 2019/0056502 A1 Feb. 21, 2019

(30) Foreign Application Priority Data

Aug. 15, 2017 (CN) .......................... 2017 1 0697728

(51) Int. Cl.
*G01S 17/89* (2020.01)
*G06T 7/70* (2017.01)
*G06T 7/20* (2017.01)
*G01S 7/48* (2006.01)
*G01S 17/86* (2020.01)
*G01S 17/931* (2020.01)

(52) U.S. Cl.
CPC ............ *G01S 17/89* (2013.01); *G01S 7/4808* (2013.01); *G01S 17/86* (2020.01); *G06T 7/20* (2013.01); *G06T 7/70* (2017.01); *G01S 17/931* (2020.01); *G06T 2207/10028* (2013.01)

(58) Field of Classification Search
CPC ...... G01S 17/023; G01S 17/89; G01S 17/936; G01S 7/4808; G06T 2207/10028; G06T 7/20; G06T 7/70
USPC .......... 702/5, 150, 151, 159, 189; 701/26, 28
See application file for complete search history.

(56) References Cited

U.S. PATENT DOCUMENTS 8,996,228 B1* 3/2015 Ferguson ........... G01C 21/3461
 701/28
9,056,395 B1* 6/2015 Ferguson ........... G08G 1/09623
9,097,800 B1* 8/2015 Zhu ....................... G01S 13/865
(Continued)

*Primary Examiner* — John H Le
(74) *Attorney, Agent, or Firm* — Nixon Peabody LLP

(57) ABSTRACT

A specific implementation of the method includes: constructing a reflectance map based on a position and an Euler angle, obtained through a global pose optimization and used for constructing a reflectance map, of a center of a laser radar corresponding to each frame laser point cloud used for constructing the reflectance map. This implementation implements the level-by-level pose optimization of key frame laser point clouds, sample frame laser point clouds, regular frame laser point clouds selected from laser point clouds used for constructing a reflectance map, to obtain an accurate position and Euler angle, used for constructing the reflectance map, of a center of the laser radar corresponding to each frame laser point cloud used for constructing the reflectance map, so that accurate coordinates of laser points in each frame laser point cloud used for constructing the reflectance map in a world coordinate system can be obtained.

15 Claims, 4 Drawing Sheets

(56) References Cited

U.S. PATENT DOCUMENTS 9,234,618 B1 * 1/2016 Zhu .................. G01S 17/10
2019/0056501 A1 * 2/2019 Yu .................. G01S 17/023

* cited by examiner

METHOD AND APPARATUS FOR CONSTRUCTING REFLECTANCE MAP

CROSS-REFERENCE TO RELATED APPLICATION

This application is related to and claims the priority from Chinese Application No. 201710697728.8, filed on Aug. 15, 2017, entitled "Method and Apparatus for Constructing Reflectance Map," having Baidu Online Network Technology (Beijing) Co., Ltd. as the applicant, the entire disclosure of which is incorporated herein by reference.

TECHNICAL FIELD

The present application relates to the field of computers, specifically to the field of navigation, and more specifically to a method and apparatus for constructing a reflectance map.

BACKGROUND

A reflectance map may be used for accurately positioning a vehicle. Currently, a commonly used method for constructing a reflectance map of a region is as follows: a position output by a GPS device and an Euler angle output by an inertial navigation device when each frame laser point cloud is collected in the region are directly used as the position and Euler angle of the laser radar center when the each frame laser point cloud is collected, that is, used as the position and Euler angle of the laser radar center corresponding to the each frame laser point cloud. Coordinates, output by the laser radar, in a laser radar coordinate system of laser points in laser point cloud data corresponding to each frame laser point cloud are transformed by using the position output by the GPS device and the Euler angle output by the inertial navigation device when the each frame laser point cloud is collected, to obtain coordinates in a world coordinate system of the laser points in the each frame laser point cloud. Finally, each frame laser point cloud is merged according to the coordinates in the world coordinate system of the laser points in each frame laser point cloud to obtain a merged laser point cloud corresponding to the to-be-constructed reflectance map. The merged laser point cloud is then projected into a grid occupied by the region, and a mean and a variance of reflection strengths of laser points projected into each grid occupied by the region are calculated, to obtain map data of the reflectance map, so as to construct the reflectance map.

However, because the GPS device may be affected by factors such as satellite signal shifting, and the inertial navigation device may be affected by factors such as error accumulation, the position output by the GPS device and the Euler angle output by the inertial navigation device have large errors, and the coordinates, obtained after the transformation, of the laser points in each frame laser point cloud in the world coordinate system will also have large errors, leading to a reduction in the merging precision of the merged laser point cloud corresponding to the to-be-constructed reflectance map, and a reduction in the precision of the reflectance map.

SUMMARY

The present application provides a method and apparatus for constructing a reflectance map, so as to solve the technical problem mentioned in the Background section.

According to a first aspect, the present application provides a method for constructing a reflectance map, comprising: selecting, from laser point clouds collected in a region corresponding to a to-be-constructed reflectance map, laser point clouds used for constructing a reflectance map, and selecting sample frame laser point clouds from the laser point clouds used for constructing the reflectance map; selecting key frame laser point clouds from the sample frame laser point clouds, and determining an optimal key frame laser point cloud based on adjustment amounts of the key frame laser point clouds, each of the adjustment amounts being determined based on an amount of movement between a center position of a laser radar corresponding to a key frame laser point cloud after being merged with a second key frame laser point cloud and a center position of the laser radar corresponding to the key frame laser point cloud; performing a global pose optimization on laser point clouds other than the optimal key frame laser point cloud in the laser point clouds used for constructing the reflectance map, to obtain a position and an Euler angle, used for constructing the reflectance map, of a center of the laser radar corresponding to each frame laser point clouds used for constructing the reflectance map; and constructing the reflectance map based on the position and the Euler angle, used for constructing the reflectance map, of the center of the laser radar corresponding to each frame laser point clouds used for constructing the reflectance map.

According to a second aspect, the present application provides an apparatus for constructing a reflectance map, comprising: a selection unit, configured to select, from laser point clouds collected in a region corresponding to a to-be-constructed reflectance map, laser point clouds used for constructing a reflectance map, and select sample frame laser point clouds from the laser point clouds used for constructing the reflectance map; a determining unit, configured to select key frame laser point clouds from the sample frame laser point clouds, and determine an optimal key frame laser point cloud based on adjustment amounts of the key frame laser point clouds, each of the adjustment amounts being determined based on an amount of movement between a center position of a laser radar corresponding to a key frame laser point cloud after being merged with a second key frame laser point cloud and a center position of the laser radar corresponding to the key frame laser point cloud; an optimization unit, configured to perform a global pose optimization on laser point clouds other than the optimal key frame laser point cloud in the laser point clouds used for constructing the reflectance map, to obtain a position and an Euler angle, used for constructing the reflectance map, of a center of the laser radar corresponding to each frame laser point clouds used for constructing the reflectance map; and a construction unit, configured to construct the reflectance map based on the position and the Euler angle, used for constructing the reflectance map, of the center of the laser radar corresponding to each frame laser point clouds used for constructing the reflectance map.

The method and apparatus for constructing a reflectance map that are provided by the present application, by selecting, from laser point clouds collected in a region corresponding to a to-be-constructed reflectance map, laser point clouds used for constructing a reflectance map, and selecting sample frame laser point clouds from the laser point clouds used for constructing the reflectance map; selecting key frame laser point clouds from the sample frame laser point clouds, and determining an optimal key frame laser point cloud based on adjustment amounts of the key frame laser point clouds; performing a global pose optimization on laser point clouds other than the optimal key frame laser point cloud in the laser point clouds used for constructing the reflectance map, to obtain a position and an Euler angle, used for constructing the reflectance map, of a center of the laser radar corresponding to each frame laser point clouds used for constructing the reflectance map; and constructing the reflectance map based on the position and the Euler angle, used for constructing the reflectance map, of the center of the laser radar corresponding to each frame laser point clouds used for constructing the reflectance map, implements the level-by-level pose optimization of key frame laser point clouds, sample frame laser point clouds, regular frame laser point clouds selected from a laser point cloud used for constructing a reflectance map, to obtain an accurate position and Euler angle, used for constructing the reflectance map, of a center of the laser radar corresponding to each frame laser point cloud used for constructing the reflectance map, so that accurate coordinates of laser points in each frame laser point cloud used for constructing the reflectance map in a world coordinate system can be obtained, thereby improving the merging precision of a merged laser point cloud corresponding to the reflectance map, and improving the precision of the reflectance map.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
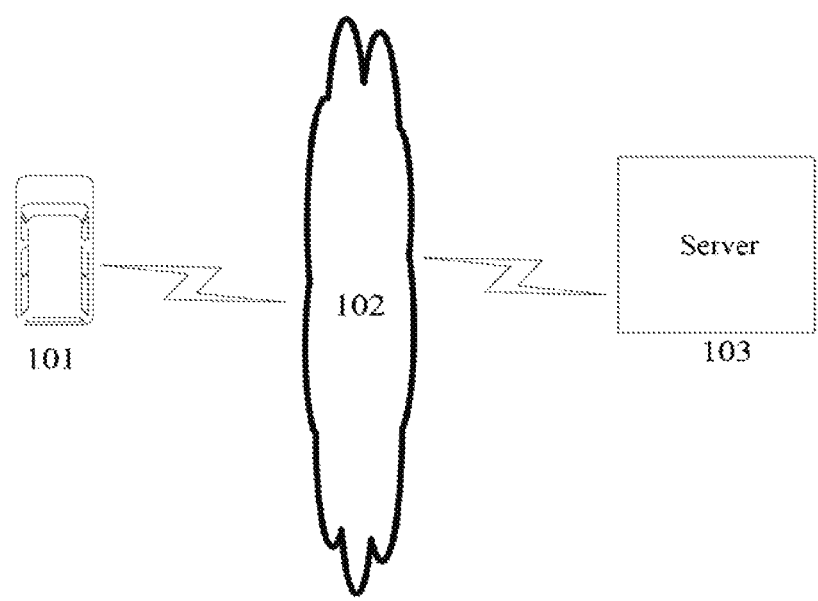
FIG. 1 shows an exemplary system architecture to which a method or apparatus for constructing a reflectance map according to an embodiment of the present application can be applied.

FIG. 1 shows an exemplary system architecture to which a method or apparatus for constructing a reflectance map according to an embodiment of the present application can be applied.

As shown in FIG. 1, the system architecture may comprise a driverless vehicle 101, a network 102, and a server 103. The network 102 is a medium for providing a communication link between the driverless vehicle 101 and the server 103. The network 102 may use a wireless communication link.

The driverless vehicle 101 may be equipped with a laser radar, a GPS device, and an inertial navigation device. The driverless vehicle 101 may drive in advance within a region corresponding to a to-be-constructed reflectance map, and use the vehicle-mounted laser radar to collect laser point clouds. The collected laser point cloud comprises a laser point formed by the projection of a laser emitted from the laser radar onto a constructing object in the region corresponding to the to-be-constructed reflectance map. Each time the laser radar scans over a circle, a frame laser point cloud can be obtained. The center position of the laser radar of the driverless vehicle 101 when the laser radar collects a laser point cloud may be obtained by using the GPS device. The laser radar may be perpendicularly connected to the GPS device. X-axis and z-axis values of a position indicated by coordinates output by the GPS device when a frame laser point cloud is collected may be used as x-axis and z-axis values of the center of the laser radar when the frame laser point cloud is collected, and a value obtained by subtracting a differential between the center of the laser radar and the GPS device in the perpendicular direction from a y-axis value of a position indicated by coordinates output by the GPS device may be used as a y-axis value of the center of the laser radar. An Euler angle of the center of the laser radar when a frame laser point cloud is collected may be obtained by using the inertial navigation device. An Euler angle output by the inertial navigation device when a frame laser point cloud is collected may be used as an Euler angle of the center of the laser radar when the frame laser point cloud is collected. That is, an Euler angle output by the inertial navigation device when a frame laser point cloud is collected may be used as an Euler angle of the center of the laser radar corresponding to the frame laser point cloud.

The driverless vehicle 101 may send, to the server 103, the laser point clouds collected during driving in the region corresponding to the to-be-constructed reflectance map. The server 103 may select, from the laser point clouds collected by the driverless vehicle 101 during driving in the region corresponding to the to-be-constructed reflectance map, laser point clouds used for constructing a reflectance map; perform the pose optimization on the laser point cloud used for constructing the reflectance map, to obtain a position and an Euler angle, used for constructing the reflectance map, of a center of the laser radar corresponding to each frame laser point cloud used for constructing the reflectance map; transform coordinates, output by the laser radar, in a laser radar coordinate system of laser points in laser point cloud data corresponding to each frame laser point cloud used for constructing the reflectance map, by using the position and Euler angle, used for constructing the reflectance map, of the center of the laser radar corresponding to each frame laser point cloud used for constructing the reflectance map, to obtain coordinates in a world coordinate system of the laser points in each frame laser point cloud used for constructing the reflectance map; then merge each frame laser point cloud used for constructing the reflectance map, that is, merge all the laser point cloud used for constructing the reflectance map, to obtain a merged laser point cloud corresponding to the to-be-constructed reflectance map; and project laser points in the merged laser point cloud corresponding to the to-be-constructed reflectance map into a grid occupied by the region corresponding to the to-be-constructed reflectance map, and calculate a mean and variance of reflection strengths of laser points projected into each grid occupied by the region, to obtain map data of the to-be-constructed reflectance map, so as to construct the reflectance map of the region.

Figure 2:
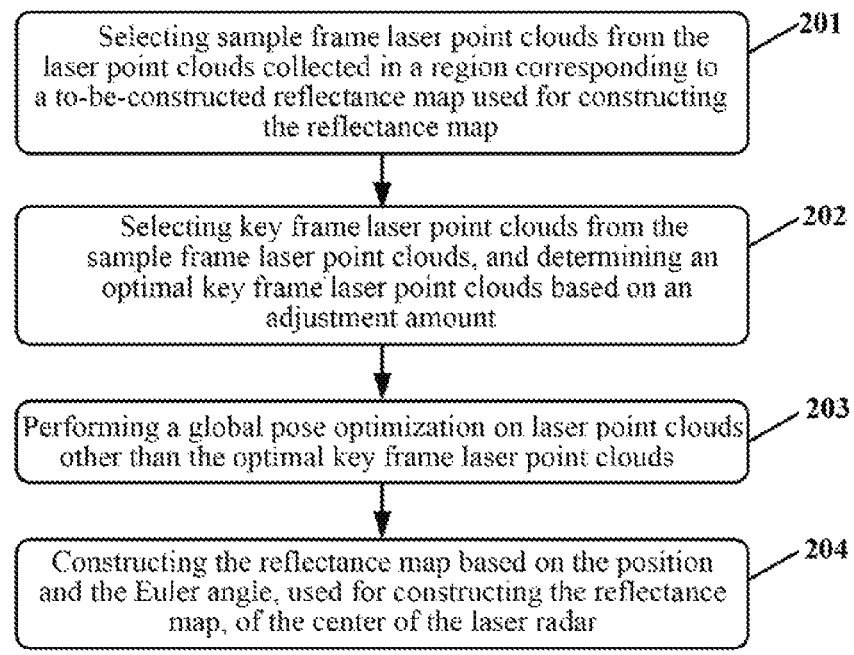
FIG. 2 is a flow chart of a method for constructing a reflectance map according to an embodiment of the present application.

Referring to FIG. 2, a flow of a method for constructing a reflectance map according to an embodiment of the present application is illustrated. The method may be executed by a server, for example, the server 103 in FIG. 1. Correspondingly, an apparatus for constructing a reflectance map may be disposed in the server, for example, the server 103 in FIG. 1. The method comprises the following steps:

At step 201, sample frame laser point clouds are selected from laser point clouds collected in a region corresponding to a to-be-constructed reflectance map.

In this embodiment, to construct a reflectance map of a region, laser point clouds need to be collected in a region corresponding to the to-be-constructed reflectance map, that is, the region. Laser point clouds used for constructing the reflectance map are selected from the laser point clouds collected in the region. Each laser point cloud used for constructing the reflectance map is merged, to obtain a merged laser point cloud corresponding to the reflectance map. The merged laser point cloud corresponding to the reflectance map is projected to obtain map data of reflectance map of the region. Whereby, the reflectance map of the region can be constructed.

In this embodiment, the surface of the Earth may be divided in advance in a world coordinate system into a plurality of grids having the same area, and each grid may correspond to a geographic scope of a preset size. The map data of the to-be-constructed reflectance map comprises: a mean and variance of reflection strengths of laser points projected into each of grids occupied by the region corresponding to the to-be-constructed reflectance map, after the merged laser point cloud corresponding to the reflectance map is projected.

The reflectance map can be used for accurately positioning a vehicle. When a vehicle is driving in a region, laser point clouds in laser point clouds collected in real time may be projected into a region corresponding to the reflectance map of the region, that is, a grid occupied by the region, according to coordinates of laser points in the laser point clouds collected in real time in a world coordinate system, and a mean and variance of reflection strengths of laser points projected into each grid are calculated. Then, the location of the vehicle may be determined according to a status of matching between the mean and variance of the reflection strengths of the laser points projected into each grid and map data of a pre-constructed reflectance map.

In this embodiment, the position and the Euler angle of a center of the laser radar corresponding to a frame laser point cloud may refer to a position and an Euler angle of a center of the laser radar that are obtained by using a GPS device and an inertial navigation device when the frame laser point cloud is collected. The Euler angle comprises a roll angle, a pitch angle and a yaw angle. The center position of the laser radar is the center position of the laser radar in the world coordinate system.

Because the position and the Euler angle of the center of the laser radar that are obtained by using the GPS device and the inertial navigation device when each frame laser point cloud used for constructing the reflectance map is collected have errors with respect to an actual position and an actual Euler angle of the center of the laser radar when each frame laser point cloud used for constructing the reflectance map is collected, a global pose optimization needs to be performed on the collected laser point cloud used for constructing the reflectance map, to obtain the position and the Euler angle, used for constructing the reflectance map, of a center of the laser radar corresponding to each frame laser point cloud used for constructing the reflectance map. Compared with the position and the Euler angle of the center of the laser radar that are obtained by using the GPS device and the inertial navigation device when each frame laser point cloud used for constructing the reflectance map is collected, the position and the Euler angle, used for constructing the reflectance map, of the center of the laser radar corresponding to the each frame laser point cloud used for constructing the reflectance map are closer to the actual position and the actual Euler angle of the center of the laser radar when each frame laser point cloud used for constructing the reflectance map is collected.

In this embodiment, all laser point clouds collected in the region corresponding to the to-be-constructed reflectance map may be acquired first, and laser point clouds used for constructing the reflectance map is selected from all the laser point clouds collected in the region corresponding to the to-be-constructed reflectance map.

In this embodiment, a laser point cloud corresponding to a center position of the laser radar that has a low confidence level may be removed from the laser point clouds collected in the region corresponding to the to-be-constructed reflectance map, and the remaining laser point clouds collected in the region corresponding to the to-be-constructed reflectance map are used as the laser point cloud used for constructing the reflectance map.

For example, a confidence level of a center position of the laser radar corresponding to a frame laser point cloud may be determined according to a differential between the center position of the laser radar corresponding to the frame laser point cloud and a center position of the laser radar corresponding to a previous frame laser point cloud of the frame laser point cloud. Because the laser radar can quickly scan a frame laser point cloud, there is normally a small differential between a center of the laser radar corresponding to a frame laser point cloud and a center of the laser radar corresponding to a previous frame laser point cloud of the frame laser point cloud. When the differential is greater than a threshold, the center position of the laser radar corresponding to the frame laser point cloud has a low confidence level.

In some optional implementations of this embodiment, when the laser point cloud used for constructing the reflectance map is selected from the laser point clouds collected in the region corresponding to the to-be-constructed reflectance map, a laser point cloud having a collection time with an erroneous timestamp in all the laser point clouds collected in the region corresponding to the to-be-constructed reflectance map may be determined. A center position of the laser radar when a laser point cloud is collected may be obtained by using the GPS device, and a timestamp of a collection time at which the laser point cloud is collected may be a timestamp output by the GPS device. When a timestamp of a collection time of a frame laser point cloud is erroneous, correspondingly, the position, which is acquired by the GPS device, of the center of the laser radar corresponding to the frame laser point cloud has a large error. The laser point cloud having a collection time with an erroneous timestamp may be removed. A laser point cloud having an identical center position as the center position of the laser radar in all the laser point clouds collected in the region corresponding to the to-be-constructed reflectance map may be determined and removed, so as to remove a redundant frame laser point cloud collected in a case such as stopping at a road junction, thereby reducing the amount of calculation in the subsequent laser point cloud merging process and the interference to the laser point cloud merging process.

After the laser point cloud having a collection time with an erroneous timestamp and the laser point cloud having an identical center position as the center position of the laser radar are removed from all the laser point clouds collected in the region corresponding to the to-be-constructed reflectance map, the remaining laser point clouds may be used as the laser point cloud used for constructing the reflectance map.

In this embodiment, after the laser point cloud used for constructing the reflectance map is selected from the laser point clouds collected in the region corresponding to the to-be-constructed reflectance map, sample frame laser point clouds may be selected from the laser point cloud used for constructing the reflectance map.

In this embodiment, adjacent sample frame laser point clouds are laser point clouds used for constructing the reflectance map, of which the corresponding center positions of the laser radar are adjacent to each other. The sample frame laser point clouds may be selected from the laser point cloud used for constructing the reflectance map according to distances between the corresponding of the laser radar centers. For example, the selected sample frame laser point clouds satisfy the following condition: a distance between center positions of the laser radar corresponding to adjacent sample frame laser point clouds is equal to a first preset distance, which is, for example, 0.4 m. In other words, the sample frame laser point clouds may be laser point clouds used for constructing the reflectance map that are spaced from each other by the first preset distance.

At step 202, key frame laser point clouds are selected from the sample frame laser point clouds, and an optimal key frame laser point cloud is determined based on an adjustment amount.

In this embodiment, key frame laser point clouds may be selected from the sample frame laser point clouds, and an adjustment amount corresponding to each key frame laser point cloud may be determined respectively.

In this embodiment, the key frame laser point clouds may be selected from the sample frame laser point clouds according to distances between the corresponding center positions of the laser radar. Adjacent key frame laser point clouds are adjacent sample frame laser point clouds, of which the corresponding center positions of the laser radar are adjacent to each other. For example, the selected key frame laser point clouds satisfy the following condition: a distance between center positions of the laser radar corresponding to adjacent key frame laser point clouds is a second preset distance greater than the first preset distance. The second preset distance is, for example, 8 m. In other words, the key frame laser point clouds may be sample frame laser point clouds that are spaced from each other by the second preset distance.

In this embodiment, an adjustment amount corresponding to a key frame laser point cloud may be an amount of movement between a center position of the laser radar corresponding to the key frame laser point cloud after being merged with a second key frame laser point cloud and a center position of the laser radar corresponding to the key frame laser point cloud.

In this embodiment, the adjustment amount corresponding to a key frame laser point cloud may be calculated by using a preset laser point cloud merging algorithm.

For example, the adjustment amount corresponding to a key frame laser point cloud is determined by using an iterative closest point (ICP) algorithm. When laser point clouds are merged by using the ICP algorithm, a frame laser point cloud is used as an original frame laser point cloud, another frame laser point cloud is used as a target frame laser point cloud, and the original frame laser point cloud is merged with the target frame laser point cloud by using the ICP algorithm. A key frame laser point cloud and a second key frame laser point cloud merged with the key frame laser point cloud may be used as the original frame laser point cloud and the target frame laser point cloud respectively. When a key frame laser point cloud is merged with a second key frame laser point cloud by using the ICP algorithm, a transformation relationship between the key frame laser point cloud and the second key frame laser point cloud merged with the key frame laser point cloud is determined. An output result of the ICP algorithm comprises the transformation relationship between the key frame laser point cloud and the second key frame laser point cloud merged with the key frame laser point cloud. The output result of the ICP algorithm may be acquired, so as to acquire the transformation relationship between the key frame laser point cloud and the second key frame laser point cloud merged with the key frame laser point cloud. The transformation relationship comprises a translation relationship between a center position of the laser radar corresponding to the key frame laser point cloud and a center position of the laser radar corresponding to the second key frame laser point cloud merged with the key frame laser point cloud, and a rotation relationship between an Euler angle of the center of the laser radar corresponding to the key frame laser point cloud and an Euler angle of the center of the laser radar corresponding to the second key frame laser point cloud merged with the key frame laser point cloud. The translation relationship may be represented by a translation matrix, and the rotation relationship may be represented by a rotation matrix.

During the merging process, the ICP algorithm translates the center position of the laser radar corresponding to the key frame laser point cloud according to the translation relationship and rotates the Euler angle of the center of the laser radar corresponding to the key frame laser point cloud according to the rotation relationship, which is equivalent to translating and rotating the key frame laser point cloud according to the translation relationship and the rotation relationship, so that positions of laser points obtained by scanning the same spatial position in the key frame laser point cloud and the second key frame laser point cloud merged with the key frame laser point cloud coincide. After the center position of the laser radar corresponding to the key frame laser point cloud is translated according to the translation relationship, the center position of the laser radar corresponding to the key frame laser point cloud after being merged can be obtained, and thus the amount of movement between the center position of the laser radar corresponding to the key frame laser point cloud after being merged and the center position of the laser radar corresponding to the key frame laser point cloud can be obtained, so that the adjustment amount corresponding to the key frame laser point cloud can be determined.

In this embodiment, key frame laser point clouds may correspond to multiple adjustment amounts. In an example where six key frame laser point clouds are collected and an adjustment amount of the first key frame laser point cloud is determined by using the ICP algorithm, when the first key frame laser point cloud is respectively merged with the second key frame laser point cloud, the third key frame laser point cloud, the fourth key frame laser point cloud, the fifth key frame laser point cloud, and the sixth key frame laser point cloud by using the ICP algorithm, five center positions of the laser radar corresponding to the first key frame laser point cloud after being merged can be obtained, and thus amounts of movements between the five center positions of the laser radar corresponding to the first key frame laser point cloud after being merged and the center position of the laser radar corresponding to the first key frame laser point cloud can be obtained, so that five adjustment amounts corresponding to the first key frame laser point cloud can be determined.

In some optional implementations of this embodiment, an average adjustment amount corresponding to each key frame laser point cloud may be calculated respectively, and a key frame laser point cloud corresponding to the greatest average adjustment amount is determined. Then, an average adjustment amount of each of the remaining key frame laser point clouds other than the key frame laser point cloud corresponding to the greatest average adjustment amount may be recalculated, and a key frame laser point cloud corresponding to the smallest average adjustment amount in the remaining key frame laser point clouds is used as the optimal key frame laser point cloud.

The average adjustment amount corresponding to a key frame laser point cloud is obtained by dividing a sum of multiple adjustment amounts corresponding to the key frame laser point cloud by the number of other key frame laser point clouds merged with the key frame laser point cloud.

In an example where six key frame laser point clouds are collected and an average adjustment amount of the first key frame laser point cloud in the six key frame laser point clouds is calculated by using the ICP algorithm, when the first key frame laser point cloud is respectively merged with the second key frame laser point cloud, the third key frame laser point cloud, the fourth key frame laser point cloud, the fifth key frame laser point cloud, and the sixth key frame laser point cloud by using the ICP algorithm, five adjustment amounts corresponding to the first key frame laser point cloud can be obtained. The average adjustment amount corresponding to the first key frame laser point cloud can be obtained by dividing a sum of the five adjustment amounts corresponding to the first key frame laser point cloud by the number of other key frame laser point clouds merged with the first key frame laser point cloud, that is, 5.

After the average adjustment amount corresponding to each key frame laser point cloud is calculated, a key frame laser point cloud corresponding to the greatest average adjustment amount may be determined. Then, an average adjustment amount of each of the remaining key frame laser point clouds other than the key frame laser point cloud corresponding to the greatest average adjustment amount may be recalculated, and a key frame laser point cloud corresponding to the smallest average adjustment amount in the remaining key frame laser point clouds is used as the optimal key frame laser point cloud.

In an example where six key frame laser point clouds are collected and average adjustment amounts are calculated by using the ICP algorithm, when an average adjustment amount corresponding to each of the six key frame laser point clouds is calculated by using the ICP algorithm, each key frame laser point cloud corresponds to five adjustment amounts. The average adjustment amount corresponding to the first key frame laser point cloud is the greatest. Accordingly, the first key frame laser point cloud may be removed, and average adjustment amounts corresponding to the second to sixth key frame laser point clouds are recalculated. When the average adjustment amounts are recalculated, the second to sixth key frame laser point clouds each correspond to four adjustment amounts. After the recalculation, a key frame laser point cloud corresponding to the smallest average adjustment amount in the remaining key frame laser point clouds is used as the optimal key frame laser point cloud.

At step 203, a global pose optimization is performed on laser point clouds other than the optimal key frame laser point cloud.

In this embodiment, after the optimal key frame laser point cloud is determined, a global pose optimization may be performed on laser point clouds other than the optimal key frame laser point cloud in the laser point cloud used for constructing the reflectance map, to obtain the position and the Euler angle, used for constructing the reflectance map, corresponding to each frame laser point cloud used for constructing the reflectance map.

In this embodiment, the position and the Euler angle of a center of the laser radar corresponding to the optimal key frame laser point cloud may be used as the position and the Euler angle, used for constructing the reflectance map, corresponding to the optimal key frame laser point cloud. In other words, because the average adjustment amount corresponding to the optimal key frame laser point cloud is the smallest, the position and the Euler angle of the center of the laser radar corresponding to the optimal key frame laser point cloud, that is, the position and the Euler angle of the center of the laser radar that are obtained by using the GPS device and the inertial navigation device when the optimal key frame laser point cloud is collected are the most accurate. Therefore, the subsequent pose optimization is not performed on the optimal key frame laser point cloud. Instead, the position and the Euler angle of the center of the laser radar corresponding to the optimal key frame laser point cloud are directly used as the position and the Euler angle, used for constructing the reflectance map, corresponding to the optimal key frame laser point cloud, so as to avoid such cases as that an optimized position and Euler angle of the center of the laser radar corresponding to the optimal key frame laser point cloud, which are obtained after the pose optimization is performed on the optimal key frame laser point cloud, are less accurate than the position and the Euler angle of the center of the laser radar that are obtained by using the GPS device and the inertial navigation device.

The process of performing a global pose optimization on laser point clouds other than the optimal key frame laser point cloud may be equivalent to translating and rotating the position and the Euler angle of the center of the laser radar corresponding to each frame laser point cloud other than the optimal key frame laser point cloud, to obtain the position and the Euler angle, used for constructing the reflectance map, of the center of the laser radar corresponding to each frame laser point cloud used for constructing the reflectance map other than the optimal key frame laser point cloud. In this way, the position and the Euler angle, used for constructing the reflectance map, of the center of the laser radar corresponding to each frame laser point cloud used for constructing the reflectance map that is collected in the region corresponding to the to-be-constructed reflectance map are obtained.

In some optional implementations of this embodiment, when the global pose optimization is performed on the laser point clouds other than the optimal key frame laser point cloud, the pose optimization may be firstly performed on other key frame laser point clouds other than the optimal key frame laser point cloud, to obtain the position and the Euler angle, used for constructing the reflectance map, corresponding to each of the other key frame laser point clouds. Then, the pose optimization is performed on other sample frame laser point clouds other than the key frame laser point clouds in the sample frame laser point clouds, to obtain the position and the Euler angle, used for constructing the reflectance map, of a center of the laser radar corresponding to each of the other sample frame laser point clouds. Finally, the pose optimization may be performed on regular frame laser point clouds other than the sample frame laser point clouds in the laser point cloud used for constructing the reflectance map, to obtain the position and the Euler angle, used for constructing the reflectance map, of a center of the laser radar corresponding to each of the regular frame laser point clouds.

In some optional implementations of this embodiment, when the pose optimization is performed on the other key frame laser point clouds other than the optimal key frame laser point cloud, an optimized position and Euler angle of a center of the laser radar corresponding to each of the other key frame laser point clouds that satisfy a convergence condition corresponding to the other key frame laser point clouds may be calculated for the first time based on a constraint condition corresponding to the other key frame laser point clouds. Then, an optimization result and a merging result of each pair of the other key frame laser point clouds may be respectively calculated, wherein a pair of the other key frame laser point clouds includes two different other key frame laser point clouds, the optimization result of the pair of the other key frame laser point clouds may be an average value of differentials between optimized center positions of the laser radar corresponding to the other key frame laser point clouds in the pair of the other key frame laser point clouds and center positions of the laser radar corresponding to the other key frame laser point clouds, and the merging result of the pair of the other key frame laser point clouds may be an amount of movement between a center position of the laser radar obtained after each of the pair of the other key frame laser point clouds is merged with the other one of the pair of the other key frame laser point clouds, and the center position of the laser radar corresponding to the each of the pair of the other key frame laser point clouds. A transformation relationship between two other key frame laser point clouds in the pair of the other key frame laser point clouds having the corresponding optimization result and merging result with differentials greater than a threshold is removed from the constraint condition corresponding to the other key frame laser point clouds, to obtain a new constraint condition. The optimized position and Euler angle of the center of the laser radar corresponding to each of the other key frame laser point clouds that satisfy the convergence condition corresponding to the other key frame laser point clouds are recalculated according to the new constraint condition. The recalculated optimized position and Euler angle of the center of the laser radar corresponding to each of the other key frame laser point clouds are used as the position and the Euler angle, used for constructing the reflectance map, of the center of the laser radar corresponding to the each of the other key frame laser point clouds.

The constraint condition corresponding to the other key frame laser point clouds includes: the position and the Euler angle of the center of the laser radar corresponding to each of the other key frame laser point clouds, a weight corresponding to the position and the Euler angle of the center of the laser radar corresponding to each of the other key frame laser point clouds, and a transformation relationship between the other key frame laser point clouds. The transformation relationship between key frame laser point clouds comprises: a transformation relationship between any two other key frame laser point clouds.

In this embodiment, a transformation relationship between other key frame laser point clouds before optimization and a transformation relationship between other key frame laser point clouds after optimization may be respectively determined by using the preset laser point cloud merging algorithm such as the ICP algorithm.

When the pose optimization is performed on the other key frame laser point clouds based on the constraint condition corresponding to the other key frame laser point clouds, the positions and the Euler angles, used for constructing the reflectance map, of the laser radar centers corresponding to the other key frame laser point clouds need to be made as close as possible to the positions and the Euler angles of the laser radar centers corresponding to the other key frame laser point clouds before optimization. In addition, the transformation relationship between the other key frame laser point clouds after optimization needs to be made as close as possible to the transformation relationship between the other key frame laser point clouds before optimization.

The process of calculating, based on a constraint condition corresponding to the other key frame laser point clouds, an optimized position and Euler angle of a center of the laser radar corresponding to each of the other key frame laser point clouds that satisfy a convergence condition corresponding to the other key frame laser point clouds may be equivalent to translating and rotating the position and the Euler angle of the center of the laser radar corresponding to each of the other key frame laser point clouds, until the convergence condition corresponding to the other key frame laser point clouds is satisfied, to obtain the optimized position and Euler angle of the center of the laser radar corresponding to each of the other key frame laser point clouds. The optimized position and Euler angle of the center of the laser radar corresponding to each of the other key frame laser point clouds may be used as the position and the Euler angle, used for constructing the reflectance map, of the center of the laser radar corresponding to the each of the other key frame laser point clouds.

In this embodiment, a target function may be constructed based on the constraint condition corresponding to the other key frame laser point clouds, where the convergence condition corresponding to the other key frame laser point clouds may be that a function value of the target function is less than a threshold. The process of calculating, based on a constraint condition corresponding to the other key frame laser point clouds, an optimized position and Euler angle of a center of the laser radar corresponding to each of the other key frame laser point clouds that satisfy a convergence condition corresponding to the other key frame laser point clouds may be equivalent to translating and rotating the position and the Euler angle of the center of the laser radar corresponding to each of the other key frame laser point clouds, until the function value of the target function is less than the threshold.

In some optional implementations of this embodiment, the convergence condition corresponding to the other key frame laser point clouds comprises: a sum of a pose differential corresponding to the other key frame laser point clouds and a transformation relationship differential corresponding to the other key frame laser point clouds is less than a threshold, the pose differential corresponding to the other key frame laser point clouds is a sum of differentials between the optimized position and Euler angle of the center of the laser radar corresponding to each of the other key frame laser point clouds and the position and the Euler angle of the center of the laser radar corresponding to the each of the other key frame laser point clouds before optimization, the transformation relationship differential corresponding to the other key frame laser point clouds is a sum of differentials between transformation relationships between any two other key frame laser point clouds after optimization and transformation relationships between any two other key frame laser point clouds before optimization.

A differential between a transformation relationship between any two other key frame laser point clouds after optimization and a transformation relationship between any two other key frame laser point clouds before optimization may be determined according to differentials between a translation amount and a rotation amount corresponding to the transformation relationship between any two other key frame laser point clouds after optimization and a translation amount and a rotation amount corresponding to the transformation relationship between any two other key frame laser point clouds before optimization.

In the constraint condition corresponding to the other key frame laser point clouds, the weight corresponding to the position and the Euler angle of the center of the laser radar corresponding to the other key frame laser point clouds may be used as a weight of the pose differential corresponding to the other key frame laser point clouds.

After the optimized position and Euler angle of the center of the laser radar corresponding to each of the other key frame laser point clouds that satisfy the convergence condition corresponding to the other key frame laser point clouds are calculated for the first time based on the constraint condition corresponding to the other key frame laser point clouds, an optimization result and a merging result of each pair of the other key frame laser point clouds may be respectively calculated. Any two other key frame laser point clouds may constitute a pair of the other key frame laser point clouds. The optimization result of the pair of the other key frame laser point clouds may be an average value of differentials between optimized center positions of the laser radar corresponding to the other key frame laser point clouds in the pair of the other key frame laser point clouds and center positions of the laser radar corresponding to the other key frame laser point clouds before optimization.

The merging result of the pair of the other key frame laser point clouds may be an amount of movement between a center position of the laser radar obtained after each of the pair of the other key frame laser point clouds is merged with the other one of the pair of the other key frame laser point clouds, and the center position of the laser radar corresponding to the each of the pair of the other key frame laser point clouds.

In an example where a pair of the other key frame laser point clouds comprises the first other key frame laser point cloud and the second other key frame laser point cloud, the optimization result of the pair of the other key frame laser point clouds may be an average value of a differential between an optimized center position of the laser radar corresponding to the first other key frame laser point cloud and a center position of the laser radar corresponding to the first other key frame laser point cloud and a differential between an optimized center position of the laser radar corresponding to the second other key frame laser point cloud and a center position of the laser radar corresponding to the second other key frame laser point cloud. The merging result of the pair of the other key frame laser point clouds may be an average value of an amount of movement between a center position of the laser radar corresponding to the first other key frame laser point cloud after the first other key frame laser point cloud is merged with the second other key frame laser point cloud by using the ICP algorithm and a center position of the laser radar corresponding to the first other key frame laser point cloud before merging and an amount of movement between a center position of the laser radar corresponding to the second other key frame laser point cloud after the second other key frame laser point cloud is merged with the first other key frame laser point cloud and a center position of the laser radar corresponding to the second other key frame laser point cloud before merging.

After the optimization result and the merging result of each pair of the other key frame laser point clouds are calculated, a differential between the optimization result and the merging result of each pair of the other key frame laser point clouds may be calculated. When the differential between the optimization result and the merging result of a pair of the other key frame laser point clouds is greater than a threshold, a transformation relationship between two other key frame laser point clouds in the pair of the other key frame laser point clouds is removed from the constraint condition, to obtain a new constraint condition. The optimized position and Euler angle of the center of the laser radar corresponding to each of the other key frame laser point clouds that satisfy the convergence condition corresponding to the other key frame laser point clouds are recalculated according to the new constraint condition. The recalculated optimized position and Euler angle of the center of the laser radar corresponding to each of the other key frame laser point clouds that satisfy the convergence condition corresponding to the other key frame laser point clouds are used as the position and the Euler angle, used for constructing the reflectance map, corresponding to the each of the other key frame laser point clouds.

After the pose optimization is performed on the other key frame laser point clouds other than the optimal key frame laser point cloud to obtain the position and the Euler angle, used for constructing the reflectance map, corresponding to each of the other key frame laser point clouds, the pose optimization may be performed on other sample frame laser point clouds other than the key frame laser point clouds in the sample frame laser point clouds, to obtain the position and the Euler angle, used for constructing the reflectance map, of a center of the laser radar corresponding to each of the other sample frame laser point clouds.

In some optional implementations of this embodiment, when the pose optimization is performed on other sample frame laser point clouds other than the key frame laser point clouds in the sample frame laser point clouds, an optimized position and Euler angle of a center of the laser radar corresponding to each of the other sample frame laser point clouds that satisfy a convergence condition corresponding to the other sample frame laser point clouds may be calculated based on a constraint condition corresponding to the other sample frame laser point clouds, and the optimized position and Euler angle of the center of the laser radar corresponding to each of the other sample frame laser point clouds that satisfy the convergence condition corresponding to the other sample frame laser point clouds are used as the position and the Euler angle, used for constructing the reflectance map, of the center of the laser radar corresponding to the each of the other sample frame laser point clouds.

The constraint condition corresponding to the other sample frame laser point clouds includes: the position and the Euler angle of the center of the laser radar corresponding to each of the other sample frame laser point clouds, a weight corresponding to the position and the Euler angle of the center of the laser radar corresponding to each of the other sample frame laser point clouds, and a transformation relationship between adjacent other sample frame laser point clouds. A transformation relationship between adjacent sample frame laser point clouds comprises: a transformation relationship between any two adjacent sample frame laser point clouds. Adjacent other sample frame laser point clouds are other sample frame laser point clouds, of which the corresponding center positions of the laser radar are adjacent to each other.

When the pose optimization is performed on the other sample frame laser point clouds based on the constraint condition corresponding to the other sample frame laser point clouds, the obtained positions and Euler angles, used for constructing the reflectance map, of the laser radar centers corresponding to the other sample frame laser point clouds need to be made as close as possible to the positions and the Euler angles of the laser radar centers corresponding to the other sample frame laser point clouds. In addition, the transformation relationship between adjacent other sample frame laser point clouds after optimization needs to be made as close as possible to the transformation relationship between adjacent other sample frame laser point clouds before optimization.

The process of calculating, based on a constraint condition corresponding to the other sample frame laser point clouds, an optimized position and Euler angle of a center of the laser radar corresponding to each of the other sample frame laser point clouds that satisfy a convergence condition corresponding to the other sample frame laser point clouds may be equivalent to translating and rotating the position and the Euler angle of the center of the laser radar corresponding to each of the other sample frame laser point clouds, until the convergence condition corresponding to the other sample frame laser point clouds is satisfied, to obtain the optimized position and Euler angle of the center of the laser radar corresponding to each of the other sample frame laser point clouds. The optimized position and Euler angle of the center of the laser radar corresponding to each of the other sample frame laser point clouds are used as the position and the Euler angle, used for constructing the reflectance map, of the center of the laser radar corresponding to the each of the other sample frame laser point clouds.

In this embodiment, a target function may be constructed based on the constraint condition corresponding to the other sample frame laser point clouds, where the convergence condition corresponding to the other sample frame laser point clouds may be that a function value of the target function is less than a threshold. The process of calculating, based on a constraint condition corresponding to the other sample frame laser point clouds, an optimized position and Euler angle of a center of the laser radar corresponding to each of the other sample frame laser point clouds that satisfy a convergence condition corresponding to the other sample frame laser point clouds may be equivalent to translating and rotating the position and the Euler angle of the center of the laser radar corresponding to each of the other sample frame laser point clouds, until the function value of the target function is less than the threshold.

In some optional implementations of this embodiment, the convergence condition corresponding to the other sample frame laser point clouds comprises: a sum of a pose differential corresponding to the other sample frame laser point clouds and a transformation relationship differential corresponding to the other sample frame laser point clouds is less than a threshold, the pose differential corresponding to the other sample frame laser point clouds is a sum of differentials between the optimized position and Euler angle of the center of the laser radar corresponding to each of the other sample frame laser point clouds and the position and the Euler angle of the center of the laser radar corresponding to the each of the other sample frame laser point clouds, the transformation relationship differential corresponding to the other sample frame laser point clouds is a sum of differentials between transformation relationships between adjacent other sample frame laser point clouds after optimization and transformation relationships between adjacent other sample frame laser point clouds before optimization, and a weight corresponding to the position and the Euler angle of the center of the laser radar corresponding to the other sample frame laser point clouds is a weight of the pose differential corresponding to the other sample frame laser point clouds.

A differential between a transformation relationship between adjacent other sample frame laser point clouds after optimization and a transformation relationship between adjacent other sample frame laser point clouds before optimization may be determined according to differentials between a translation amount and a rotation amount corresponding to the transformation relationship between adjacent other sample frame laser point clouds after optimization and a translation amount and a rotation amount corresponding to the transformation relationship between adjacent other sample frame laser point clouds before optimization.

In the constraint condition corresponding to the other sample frame laser point clouds, the weight corresponding to the position and the Euler angle of the center of the laser radar corresponding to the other sample frame laser point clouds may be used as a weight of the pose differential corresponding to the other sample frame laser point clouds.

After the pose optimization is performed on the other sample frame laser point clouds to obtain the position and the Euler angle, used for constructing the reflectance map, corresponding to each of the other sample frame laser point clouds, the pose optimization may be performed on regular frame laser point clouds other than the sample frame laser point clouds in the laser point cloud used for constructing the reflectance map, to obtain the position and the Euler angle, used for constructing the reflectance map, of a center of the laser radar corresponding to each of the regular frame laser point clouds.

In some optional implementations of this embodiment, when the pose optimization is performed on the regular frame laser point clouds other than the sample frame laser point clouds in the laser point cloud used for constructing the reflectance map, an optimized position and Euler angle of a center of the laser radar corresponding to each of the regular frame laser point clouds that satisfy a convergence condition corresponding to the regular frame laser point clouds may be calculated based on a constraint condition corresponding to the regular frame laser point clouds. The optimized position and Euler angle of the center of the laser radar corresponding to each of the regular frame laser point clouds are used as the position and the Euler angle, used for constructing the reflectance map, of the center of the laser radar corresponding to the each of the regular frame laser point clouds.

The constraint condition corresponding to the regular frame laser point clouds includes: the position and the Euler angle of the center of the laser radar corresponding to each of the regular frame laser point clouds, a weight corresponding to the position and the Euler angle of the center of the laser radar corresponding to each of the regular frame laser point clouds, and a transformation relationship between adjacent regular frame laser point clouds. Adjacent regular frame laser point clouds are regular frame laser point clouds, of which the corresponding center positions of the laser radar are adjacent to each other. The transformation relationship between adjacent regular frame laser point clouds comprises: a transformation relationship between any two adjacent regular frame laser point clouds.

When the pose optimization is performed on the regular frame laser point clouds based on the constraint condition corresponding to the regular frame laser point clouds, the positions and the Euler angles, used for constructing the reflectance map, of the laser radar centers corresponding to the regular frame laser point clouds need to be made as close as possible to the positions and the Euler angles of the laser radar centers corresponding to the regular frame laser point clouds. In addition, the transformation relationship between adjacent regular frame laser point clouds after optimization needs to be made as close as possible to the transformation relationship between adjacent regular frame laser point clouds before optimization.

The process of calculating, based on a constraint condition corresponding to the regular frame laser point clouds, an optimized position and Euler angle of a center of the laser radar corresponding to each of the regular frame laser point clouds that satisfy a convergence condition corresponding to the regular frame laser point clouds may be equivalent to translating and rotating the position and the Euler angle of the center of the laser radar corresponding to each of the regular frame laser point clouds, until the convergence condition corresponding to the regular frame laser point clouds is satisfied, to obtain the optimized position and Euler angle of the center of the laser radar corresponding to each of the regular frame laser point clouds. The optimized position and Euler angle of the center of the laser radar corresponding to each of the regular frame laser point clouds are used as the position and the Euler angle, used for constructing the reflectance map, of the center of the laser radar corresponding to the each of the regular frame laser point clouds.

In this embodiment, a target function may be constructed based on the constraint condition corresponding to the regular frame laser point clouds, where the convergence condition corresponding to the regular frame laser point clouds may be that a function value of the target function is less than a threshold. The process of calculating, based on a constraint condition corresponding to the regular frame laser point clouds, an optimized position and Euler angle of a center of the laser radar corresponding to each of the regular frame laser point clouds that satisfy a convergence condition corresponding to the regular frame laser point clouds may be equivalent to translating and rotating the position and the Euler angle of the center of the laser radar corresponding to each of the regular frame laser point clouds, until the function value of the target function is less than the threshold.

In some optional implementations of this embodiment, the convergence condition corresponding to the regular frame laser point clouds comprises: a sum of a pose differential corresponding to the regular frame laser point clouds and a transformation relationship differential corresponding to the regular frame laser point clouds is less than a threshold, the pose differential corresponding to the regular frame laser point clouds is a sum of differentials between the optimized position and Euler angle of the center of the laser radar corresponding to each of the regular frame laser point clouds and the position and the Euler angle of the center of the laser radar corresponding to the each of the regular frame laser point clouds before optimization, and the transformation relationship differential corresponding to the regular frame laser point clouds is a sum of differentials between transformation relationships between adjacent regular frame laser point clouds after optimization and transformation relationships between adjacent regular frame laser point clouds before optimization.

A differential between a transformation relationship between adjacent regular frame laser point clouds after optimization and a transformation relationship between adjacent regular frame laser point clouds before optimization may be determined according to differentials between a translation amount and a rotation amount corresponding to the transformation relationship between adjacent regular frame laser point clouds after optimization and a translation amount and a rotation amount corresponding to the transformation relationship between adjacent regular frame laser point clouds before optimization.

In the constraint condition corresponding to the regular frame laser point clouds, the weight corresponding to the position and the Euler angle of the center of the laser radar corresponding to the regular frame laser point clouds may be used as a weight of the pose differential corresponding to the regular frame laser point clouds.

At step 204, the reflectance map is constructed based on the corresponding position and Euler angle used for constructing the reflectance map.

In this embodiment, after the position and the Euler angle, used for constructing the reflectance map, corresponding to each frame laser point cloud used for constructing the reflectance map collected in the region corresponding to the to-be-constructed reflectance map are obtained, coordinates, output by the laser radar, in a laser radar coordinate system of laser points in laser point cloud data corresponding to each frame laser point cloud used for constructing the reflectance map may be transformed by using the position and Euler angle, used for constructing the reflectance map, of the center of the laser radar corresponding to each frame laser point cloud used for constructing the reflectance map, to obtain coordinates in a world coordinate system of the laser points in each frame laser point cloud used for constructing the reflectance map. Then, each frame laser point cloud used for constructing the reflectance map is merged, that is, all the laser point clouds used for constructing the reflectance map are merged, to obtain a merged laser point cloud corresponding to the reflectance map. Laser points in the merged laser point cloud corresponding to the reflectance map are projected into a grid occupied by the region corresponding to the to-be-constructed reflectance map, and a mean and variance of reflection strengths of laser points projected into each grid occupied by the region are calculated, to obtain map data of the reflectance map, so as to construct the reflectance map of the region.

In this embodiment, the position used for constructing the reflectance map corresponding to each frame laser point cloud used for constructing the reflectance map may be represented by coordinates in the world coordinate system, and coordinates of a position used for constructing the reflectance map corresponding to a frame laser point cloud used for constructing the reflectance map in the world coordinate system may comprises x-axis, y-axis, and z-axis values of the position used for constructing the reflectance map corresponding to the frame laser point cloud used for constructing the reflectance map.

In this embodiment, a translation matrix may be calculated according to coordinates in the world coordinate system of a position used for constructing the reflectance map corresponding to a frame laser point cloud used for constructing the reflectance map, and a rotation matrix may be obtained according to an Euler angle used for constructing the reflectance map corresponding to a frame laser point cloud used for constructing the reflectance map. Then, coordinates of each laser point in a frame laser point cloud used for constructing the reflectance map in the laser radar coordinate system may be transformed according to the rotation matrix and the translation matrix, to obtain coordinates of the each laser point in the frame laser point cloud used for constructing the reflectance map in the world coordinate system.

In this embodiment, the world coordinate system may be a Universal Transverse Mercator (UTM) coordinate system.

In this embodiment, after the coordinates in the world coordinate system of the laser points in each frame laser point cloud used for constructing the reflectance map are obtained according to the translation matrix and the rotation matrix that are obtained based on the coordinates in the world coordinate system of the position used for constructing the reflectance map and the Euler angle corresponding to each frame laser point cloud used for constructing the reflectance map, each frame laser point cloud used for constructing the reflectance map may be merged, to obtain a merged laser point cloud corresponding to the to-be-constructed reflectance map. Then, according to x-axis and y-axis values of coordinates in the world coordinate system of laser points in the merged laser point cloud corresponding to the to-be-constructed reflectance map and lengths of a grid in the x-axis direction and the y-axis direction, for example, the length of side of the grid when the grid is square, a grid that is occupied by the region corresponding to the to-be-constructed reflectance map and to which laser points in each merged laser point cloud corresponding to the to-be-constructed reflectance map are projected may be determined respectively, and a mean and variance of reflection strengths of laser points projected into each grid occupied by the region corresponding to the to-be-constructed reflectance map are calculated respectively, so as to obtain the map data of the to-be-constructed reflectance map and construct the reflectance map.

Figure 3:
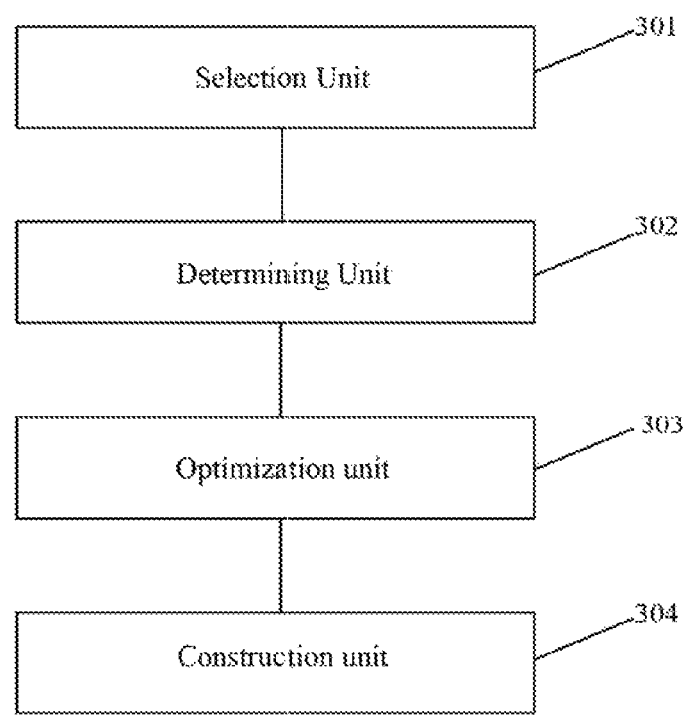
FIG. 3 is a schematic structural diagram of an apparatus for constructing a reflectance map according to an embodiment of the present application.

Referring to FIG. 3, as an implementation of the methods shown in the above-mentioned figures, the present application provides an embodiment of an apparatus for constructing a reflectance map. This apparatus embodiment corresponds to the method embodiment shown in FIG. 2.

As shown in FIG. 3, the apparatus for constructing a reflectance map comprises: a selection unit 301, a determining unit 302, an optimization unit 303, and a construction unit 304. The selection unit 301 is configured to select, from laser point clouds collected in a region corresponding to a to-be-constructed reflectance map, laser point clouds used for constructing a reflectance map, and select sample frame laser point clouds from the laser point clouds used for constructing the reflectance map. The determining unit 302 is configured to select key frame laser point clouds from the sample frame laser point clouds, and determine an optimal key frame laser point cloud based on adjustment amounts of the key frame laser point clouds, each of the adjustment amounts being determined based on an amount of movement between a center position of a laser radar corresponding to a key frame laser point cloud after being merged with a second key frame laser point cloud and a center position of the laser radar corresponding to the key frame laser point cloud. The optimization unit 303 is configured to perform a global pose optimization on laser point clouds other than the optimal key frame laser point cloud in the laser point clouds used for constructing the reflectance map, to obtain the position and the Euler angle, used for constructing the reflectance map, of a center of the laser radar corresponding to each frame laser point clouds used for constructing the reflectance map. The construction unit 304 is configured to construct the reflectance map based on the position and the Euler angle, used for constructing the reflectance map, of the center of the laser radar corresponding to each frame laser point clouds used for constructing the reflectance map.

In some optional implementations of this embodiment, the selection unit is further configured to: remove laser point clouds having a collection time with an erroneous timestamp, from the laser point clouds collected in the region corresponding to the to-be-constructed reflectance map; remove laser point clouds having identical center positions of the laser radar, from the laser point clouds collected in the region corresponding to the to-be-constructed reflectance map; and use the remaining laser point clouds in the laser point clouds collected in the region corresponding to the to-be-constructed reflectance map, as the laser point clouds used for constructing a reflectance map.

In some optional implementations of this embodiment, the determining unit is further configured to: calculate an average adjustment amount of each key frame laser point cloud, wherein the average adjustment amount is obtained by dividing a sum of the adjustment amounts corresponding to the key frame laser point cloud by the number of other key frame laser point clouds merged with the key frame laser point cloud; determine a key frame laser point cloud corresponding to the greatest average adjustment amount, and recalculate average adjustment amounts of the remaining key frame laser point clouds other than the key frame laser point cloud corresponding to the greatest average adjustment amount; and use a key frame laser point cloud corresponding to the smallest average adjustment amount in the remaining key frame laser point clouds as the optimal key frame laser point cloud.

In some optional implementations of this embodiment, the optimization unit includes: an other-key-frame optimization subunit, configured to use the position and the Euler angle of a center of the laser radar corresponding to the optimal key frame laser point cloud as the position and the Euler angle, used for constructing the reflectance map, of the center of the laser radar corresponding to the optimal key frame laser point cloud, and perform the pose optimization on other key frame laser point clouds other than the optimal key frame laser point cloud, to obtain the position and the Euler angle, used for constructing the reflectance map, of a center of the laser radar corresponding to each of the other key frame laser point clouds; an other-sample-frame optimization subunit, configured to perform the pose optimization on other sample frame laser point clouds other than the key frame laser point cloud in the sample frame laser point clouds, to obtain the position and the Euler angle, used for constructing the reflectance map, of a center of the laser radar corresponding to each of the other sample frame laser point clouds; and a regular-frame optimization subunit, configured to perform the pose optimization on regular frame laser point clouds other than the sample frame laser point clouds in the laser point cloud used for constructing the reflectance map, to obtain the position and the Euler angle, used for constructing the reflectance map, of a center of the laser radar corresponding to each of the regular frame laser point clouds.

In some optional implementations of this embodiment, the other-key-frame optimization subunit is further configured to: calculate, based on a constraint condition corresponding to the other key frame laser point clouds, an optimized position and Euler angle of a center of the laser radar corresponding to each of the other key frame laser point clouds that satisfy a convergence condition corresponding to the other key frame laser point clouds, wherein the constraint condition corresponding to the other key frame laser point clouds includes: the position and the Euler angle of the center of the laser radar corresponding to each of the other key frame laser point clouds, a weight corresponding to the position and the Euler angle of the center of the laser radar corresponding to each of the other key frame laser point clouds, and a transformation relationship between the other key frame laser point clouds; respectively calculate an optimization result and a merging result of each pair of the other key frame laser point clouds, wherein the optimization result of the pair of the other key frame laser point clouds is an average value of differentials between optimized center positions of the laser radar corresponding to the other key frame laser point clouds in the pair of the other key frame laser point clouds and center positions of the laser radar corresponding to the other key frame laser point clouds, and the merging result of the pair of the other key frame laser point clouds is an amount of movement between a center position of the laser radar obtained after each of the pair of the other key frame laser point clouds is merged with the other one of the pair of the other key frame laser point clouds, and the center position of the laser radar corresponding to the each of the pair of the other key frame laser point clouds; remove, from the constraint condition corresponding to the other key frame laser point clouds, a transformation relationship between two other key frame laser point clouds in the pair of the other key frame laser point clouds having the corresponding optimization result and merging result with differentials greater than a threshold, to obtain a new constraint condition; calculating, according to the new constraint condition, the optimized position and Euler angle of the center of the laser radar corresponding to each of the other key frame laser point clouds that satisfy the convergence condition corresponding to the other key frame laser point clouds; and use the optimized position and Euler angle of the center of the laser radar corresponding to each of the other key frame laser point clouds as the position and the Euler angle, used for constructing the reflectance map, of the center of the laser radar corresponding to the each of the other key frame laser point clouds.

In some optional implementations of this embodiment, the convergence condition corresponding to the other key frame laser point clouds comprises: a sum of a pose differential corresponding to the other key frame laser point clouds and a transformation relationship differential corresponding to the other key frame laser point clouds is less than a threshold, the pose differential corresponding to the other key frame laser point clouds is a sum of differentials between the optimized position and Euler angle of the center of the laser radar corresponding to each of the other key frame laser point clouds and the position and the Euler angle of the center of the laser radar corresponding to the each of the other key frame laser point clouds before optimization, the transformation relationship differential corresponding to the other key frame laser point clouds is a sum of differentials between transformation relationships between any two other key frame laser point clouds after optimization and transformation relationships between any two other key frame laser point clouds before optimization, and a weight corresponding to the position and the Euler angle of the center of the laser radar corresponding to the other key frame laser point clouds is a weight of the pose differential corresponding to the other key frame laser point clouds.

In some optional implementations of this embodiment, the other-key-frame optimization subunit is further configured to: calculate, based on a constraint condition corresponding to the other sample frame laser point clouds, an optimized position and Euler angle of a center of the laser radar corresponding to each of the other sample frame laser point clouds that satisfy a convergence condition corresponding to the other sample frame laser point clouds, where the constraint condition corresponding to the other sample frame laser point clouds includes: the position and the Euler angle of the center of the laser radar corresponding to each of the other sample frame laser point clouds, a weight corresponding to the position and the Euler angle of the center of the laser radar corresponding to each of the other sample frame laser point clouds, and a transformation relationship between adjacent other sample frame laser point clouds; and use the optimized position and Euler angle of the center of the laser radar corresponding to each of the other sample frame laser point clouds as the position and the Euler angle, used for constructing the reflectance map, of the center of the laser radar corresponding to the each of the other sample frame laser point clouds.

In some optional implementations of this embodiment, the convergence condition corresponding to the other sample frame laser point clouds comprises: a sum of a pose differential corresponding to the other sample frame laser point clouds and a transformation relationship differential corresponding to the other sample frame laser point clouds is less than a threshold, the pose differential corresponding to the other sample frame laser point clouds is a sum of differentials between the optimized position and Euler angle of the center of the laser radar corresponding to each of the other sample frame laser point clouds and the position and the Euler angle of the center of the laser radar corresponding to the each of the other sample frame laser point clouds, the transformation relationship differential corresponding to the other sample frame laser point clouds is a sum of differentials between transformation relationships between adjacent other sample frame laser point clouds after optimization and transformation relationships between adjacent other sample frame laser point clouds before optimization, and a weight corresponding to the position and the Euler angle of the center of the laser radar corresponding to the other sample frame laser point clouds is a weight of the pose differential corresponding to the other sample frame laser point clouds.

In some optional implementations of this embodiment, the regular-frame optimization subunit is further configured to: calculate, based on a constraint condition corresponding to the regular frame laser point clouds, an optimized position and Euler angle of a center of the laser radar corresponding to each of the regular frame laser point clouds that satisfy a convergence condition corresponding to the regular frame laser point clouds, where the constraint condition corresponding to the regular frame laser point clouds includes: the position and the Euler angle of the center of the laser radar corresponding to each of the regular frame laser point clouds, a weight corresponding to the position and the Euler angle of the center of the laser radar corresponding to each of the regular frame laser point clouds, and a transformation relationship between adjacent regular frame laser point clouds; and use the optimized position and Euler angle of the center of the laser radar corresponding to each of the regular frame laser point clouds as the position and the Euler angle, used for constructing the reflectance map, of the center of the laser radar corresponding to the each of the regular frame laser point clouds.

In some optional implementations of this embodiment, the convergence condition corresponding to the regular frame laser point clouds comprises: a sum of a pose differential corresponding to the regular frame laser point clouds and a transformation relationship differential corresponding to the regular frame laser point clouds is less than a threshold, the pose differential corresponding to the regular frame laser point clouds is a sum of differentials between the optimized position and Euler angle of the center of the laser radar corresponding to each of the regular frame laser point clouds and the position and the Euler angle of the center of the laser radar corresponding to the each of the regular frame laser point clouds, the transformation relationship differential corresponding to the regular frame laser point clouds is a sum of differentials between transformation relationships between adjacent regular frame laser point clouds after optimization and transformation relationships between adjacent regular frame laser point clouds before optimization, and a weight corresponding to the position and the Euler angle of the center of the laser radar corresponding to the regular frame laser point clouds is a weight of the pose differential corresponding to the regular frame laser point clouds.

Figure 4:
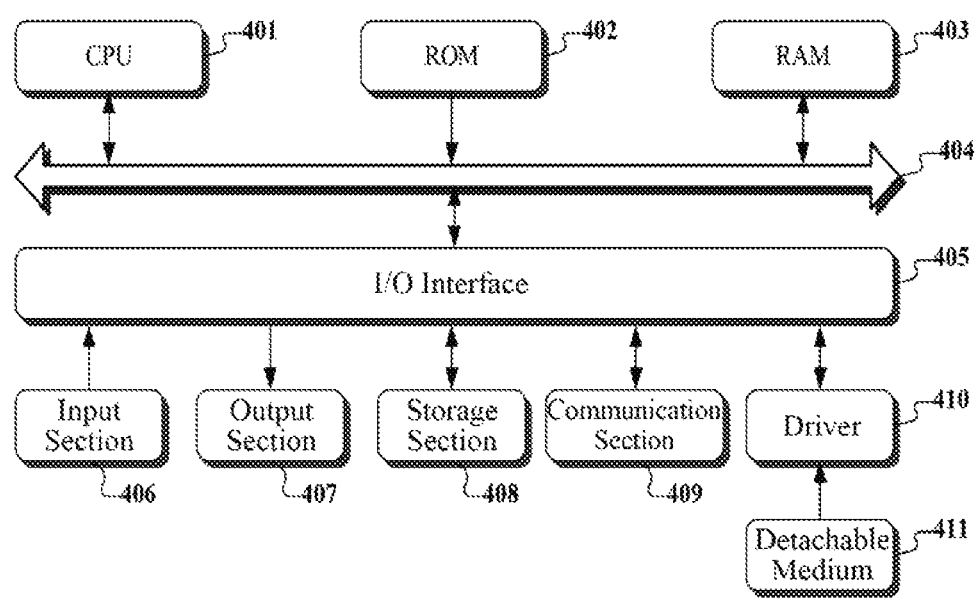
FIG. 4 is a schematic structural diagram of a computer system adapted to implement a server according to an embodiment of the present application.

Referring to FIG. 4, a schematic structural diagram of a computer system 400 adapted to implement a server of the embodiments of the present application is shown. The server shown in FIG. 4 is only an example, rather than limiting the functions and the usage range of the present application.

As shown in FIG. 4, the computer system 400 includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the system 400. The CPU 401, the ROM 402 and the RAM 403 are connected to each other through a bus 404. An input/output (I/O) interface 405 is also connected to the bus 404.

The following components are connected to the I/O interface 405: an input portion 406 including a keyboard, a mouse etc.; an output portion 407 comprising a cathode ray tube (CRT), a liquid crystal display device (LCD), a speaker etc.; a storage portion 408 including a hard disk and the like; and a communication portion 409 comprising a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 409, and/or may be installed from the removable media 411. The computer program, when executed by the central processing unit (CPU) 401, implements the above mentioned functionalities as defined by the methods of the present application.

The present application provides a server comprising the apparatus depicted in FIG. 3. The server may be configured with one or more processor; a memory storing one or more programs, which contains programs for executing instructions described in steps 201-204. When the one or more programs executed by the at least one processor, the at least one processor performs operations descripted in steps 201-204.

The present application provides a non-volatile computer storage medium, which non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: select, from laser point clouds collected in a region corresponding to a to-be-constructed reflectance map, laser point clouds used for constructing a reflectance map, and select sample frame laser point clouds from the laser point clouds used for constructing the reflectance map; select key frame laser point clouds from the sample frame laser point clouds, and determine an optimal key frame laser point cloud based on adjustment amounts of the key frame laser point clouds, each of the adjustment amounts being determined based on an amount of movement between a center position of a laser radar corresponding to a key frame laser point cloud after being merged with a second key frame laser point cloud and a center position of the laser radar corresponding to the key frame laser point cloud; perform a global pose optimization on laser point clouds other than the optimal key frame laser point cloud in the laser point clouds used for constructing the reflectance map, to obtain the position and the Euler angle, used for constructing the reflectance map, of a center of the laser radar corresponding to each frame laser point clouds used for constructing the reflectance map; and construct the reflectance map based on the position and the Euler angle, used for constructing the reflectance map, of the center of the laser radar corresponding to each frame laser point clouds used for constructing the reflectance map.

It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an selection unit, a determining unit, a optimization unit and a construction unit, where the names of these units or modules are not considered as a limitation to the units or modules. For example, the selection unit may also be described as "a unit for selecting, from laser point clouds collected in a region corresponding to a to-be-constructed reflectance map, laser point clouds used for constructing a reflectance map, and selecting sample frame laser point clouds from the laser point cloud used for constructing the reflectance map."

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for constructing a reflectance map, comprising:
   selecting, from laser point clouds collected in a region corresponding to a to-be-constructed reflectance map, laser point clouds used for constructing a reflectance map, and selecting sample frame laser point clouds from the laser point clouds used for constructing the reflectance map;
   selecting key frame laser point clouds from the sample frame laser point clouds, and determining an optimal key frame laser point cloud based on adjustment amounts of the key frame laser point clouds, each of the adjustment amounts being determined based on an amount of movement between a center position of a laser radar corresponding to a key frame laser point cloud after being merged with a second key frame laser point cloud and a center position of the laser radar corresponding to the key frame laser point cloud;
   performing a global pose optimization on laser point clouds other than the optimal key frame laser point cloud in the laser point clouds used for constructing the reflectance map, to obtain a position and an Euler angle, used for constructing the reflectance map, of a center of the laser radar corresponding to each frame laser point clouds used for constructing the reflectance map; and
   constructing the reflectance map based on the position and the Euler angle, used for constructing the reflectance map, of the center of the laser radar corresponding to each frame laser point clouds used for constructing the reflectance map.

2. The method according to claim 1, wherein the selecting, from laser point clouds collected in a region corresponding to a to-be-constructed reflectance map, laser point clouds used for constructing a reflectance map comprises:
   removing laser point clouds having a collection time with an erroneous timestamp, from the laser point clouds collected in the region corresponding to the to-be-constructed reflectance map;
   removing laser point clouds having identical center positions of the laser radar, from the laser point clouds collected in the region corresponding to the to-be-constructed reflectance map; and
   using the remaining laser point clouds in the laser point clouds collected in the region corresponding to the to-be-constructed reflectance map, as the laser point clouds used for constructing a reflectance map.

3. The method according to claim 2, wherein the determining an optimal key frame laser point cloud based on adjustment amounts of the key frame laser point clouds comprises:
   calculating an average adjustment amount of each of the key frame laser point clouds, wherein the average adjustment amount is obtained by dividing a sum of the adjustment amounts corresponding to the key frame laser point cloud by a number of other key frame laser point clouds merged with the key frame laser point clouds;
   determining a key frame laser point cloud having a greatest average adjustment amount, and recalculating average adjustment amounts of remaining key frame laser point clouds other than the key frame laser point clouds having the greatest average adjustment amount; and
   assigning a key frame laser point clouds having a smallest average adjustment amount from the remaining key frame laser point clouds as the optimal key frame laser point cloud.

4. The method according to claim 3, wherein the performing a global pose optimization on laser point clouds other than the optimal key frame laser point clouds in the laser point clouds used for constructing the reflectance map comprises:
   using a position and an Euler angle of a center of the laser radar corresponding to the optimal key frame laser point cloud as the position and an Euler angle, used for constructing the reflectance map, of the center of the laser radar corresponding to the optimal key frame laser point cloud, and for each of other key frame laser point clouds other than the optimal key frame laser point cloud, performing the pose optimization to obtain a position and an Euler angle, used for constructing the reflectance map, of a center of the laser radar corresponding to each of the other key frame laser point clouds;

for each of other sample frame laser point clouds other than the key frame laser point cloud in the sample frame laser point clouds, performing the pose optimization to obtain a position and an Euler angle, used for constructing the reflectance map, of a center of the laser radar corresponding to each of the other sample frame laser point clouds; and for each of regular frame laser point clouds other than the sample frame laser point clouds in the laser point clouds used for constructing the reflectance map, performing the pose optimization to obtain a position and an Euler angle, used for constructing the reflectance map, of a center of the laser radar corresponding to each of the regular frame laser point clouds.

5. The method according to claim 4, wherein the for each of other key frame laser point clouds other than the optimal key frame of laser point cloud, performing the pose optimization comprises:

calculating, based on a constraint condition corresponding to the other key frame laser point clouds, an optimized position and an optimized Euler angle of a center of the laser radar corresponding to each of the other key frame laser point clouds that satisfy a convergence condition corresponding to the other key frame laser point clouds, wherein the constraint condition corresponding to the other key frame laser point clouds comprises: the position and the Euler angle of the center of the laser radar corresponding to each of the other key frame laser point clouds, a weight corresponding to the position and the Euler angle of the center of the laser radar corresponding to each of the other key frame laser point clouds, and a transformation relationship between the other key frame laser point clouds;

respectively calculating an optimization result and a merging result of each pair of the other key frame laser point clouds, wherein a pair of the other key frame laser point clouds comprises two different other key frame laser point clouds, the optimization result of the pair of the other key frame laser point clouds is an average value of differentials between optimized center positions of the laser radar corresponding to the other key frame laser point clouds in the pair of the other key frame laser point clouds and center positions of the laser radar corresponding to the other key frame laser point clouds, and the merging result of the pair of the other key frame laser point clouds is an amount of movement between a center position of the laser radar obtained after each of the pair of the other key frame laser point clouds is merged with the other one of the pair of the other key frame laser point clouds, and the center position of the laser radar corresponding to the each of the pair of the other key frame laser point clouds;

removing, from the constraint condition corresponding to the other key frame laser point clouds, a transformation relationship between two other key frame laser point clouds in the pair of the other key frame laser point clouds having the corresponding optimization result and merging result with differentials greater than a threshold, to obtain a new constraint condition;

calculating, according to the new constraint condition, the optimized position and Euler angle of the center of the laser radar corresponding to each of the other key frame laser point clouds that satisfy the convergence condition corresponding to the other key frame laser point clouds; and using the optimized position and Euler angle of the center of the laser radar corresponding to each of the other key frame laser point clouds as the position and the Euler angle, used for constructing the reflectance map, of the center of the laser radar corresponding to the each of the other key frame laser point clouds.

6. The method according to claim 5, wherein the convergence condition corresponding to the other key frame laser point clouds comprises: a sum of a pose differential corresponding to the other key frame laser point clouds and a transformation relationship differential corresponding to the other key frame laser point clouds is less than a threshold, the pose differential corresponding to the other key frame laser point clouds is a sum of differentials between the optimized position and Euler angle of the center of the laser radar corresponding to each of the other key frame laser point clouds and the position and the Euler angle of the center of the laser radar corresponding to the each of the other key frame laser point clouds before optimization, the transformation relationship differential corresponding to the other key frame laser point clouds is a sum of differentials between transformation relationships between any two other key frame laser point clouds after optimization and transformation relationships between any two other key frame laser point clouds before optimization, and a weight corresponding to the position and the Euler angle of the center of the laser radar corresponding to the other key frame laser point clouds is a weight of the pose differential corresponding to the other key frame laser point clouds.

7. The method according to claim 6, wherein the performing the pose optimization on other sample frame laser point clouds other than the key frame laser point cloud in the sample frame laser point clouds comprises:

calculating, based on a constraint condition corresponding to the other sample frame laser point clouds, an optimized position and Euler angle of a center of the laser radar corresponding to each of the other sample frame laser point clouds that satisfy a convergence condition corresponding to the other sample frame laser point clouds, wherein the constraint condition corresponding to the other sample frame laser point clouds comprises: the position and the Euler angle of the center of the laser radar corresponding to each of the other sample frame laser point clouds, a weight corresponding to the position and the Euler angle of the center of the laser radar corresponding to each of the other sample frame laser point clouds, and a transformation relationship between adjacent other sample frame laser point clouds; and using the optimized position and Euler angle of the center of the laser radar corresponding to each of the other sample frame laser point clouds as the position and the Euler angle, used for constructing the reflectance map, of the center of the laser radar corresponding to the each of the other sample frame laser point clouds.

8. The method according to claim 7, wherein the convergence condition corresponding to the other sample frame laser point clouds comprises: a sum of a pose differential corresponding to the other sample frame laser point clouds and a transformation relationship differential corresponding to the other sample frame laser point clouds is less than a threshold, the pose differential corresponding to the other sample frame laser point clouds is a sum of differentials between the optimized position and Euler angle of the center of the laser radar corresponding to each of the other sample frame laser point clouds and the position and the Euler angle of the center of the laser radar corresponding to the each of the other sample frame laser point clouds, the transformation relationship differential corresponding to the other sample frame laser point clouds is a sum of differentials between transformation relationships between adjacent other sample frame laser point clouds after optimization and transformation relationships between adjacent other sample frame laser point clouds before optimization, and a weight corresponding to the position and the Euler angle of the center of the laser radar corresponding to the other sample frame laser point clouds is a weight of the pose differential corresponding to the other sample frame laser point clouds.

9. The method according to claim 8, wherein the performing the pose optimization on regular frame laser point clouds other than the sample frame laser point clouds in the laser point clouds used for constructing a reflectance map comprises:
calculating, based on a constraint condition corresponding to the regular frame laser point clouds, an optimized position and Euler angle of a center of the laser radar corresponding to each of the regular frame laser point clouds that satisfy a convergence condition corresponding to the regular frame laser point clouds, wherein the constraint condition corresponding to the regular frame laser point clouds comprises: the position and the Euler angle of the center of the laser radar corresponding to each of the regular frame laser point clouds, a weight corresponding to the position and the Euler angle of the center of the laser radar corresponding to each of the regular frame laser point clouds, and a transformation relationship between adjacent regular frame laser point clouds; and
using the optimized position and Euler angle of the center of the laser radar corresponding to each of the regular frame laser point clouds as the position and the Euler angle, used for constructing the reflectance map, of the center of the laser radar corresponding to the each of the regular frame laser point clouds.

10. The method according to claim 9, wherein the convergence condition corresponding to the regular frame laser point clouds comprises: a sum of a pose differential corresponding to the regular frame laser point clouds and a transformation relationship differential corresponding to the regular frame laser point clouds is less than a threshold, the pose differential corresponding to the regular frame laser point clouds is a sum of differentials between the optimized position and Euler angle of the center of the laser radar corresponding to each of the regular frame laser point clouds and the position and the Euler angle of the center of the laser radar corresponding to the each of the regular frame laser point clouds, the transformation relationship differential corresponding to the regular frame laser point clouds is a sum of differentials between transformation relationships between adjacent regular frame laser point clouds after optimization and transformation relationships between adjacent regular frame laser point clouds before optimization, and a weight corresponding to the position and the Euler angle of the center of the laser radar corresponding to the regular frame laser point clouds is a weight of the pose differential corresponding to the regular frame laser point clouds.

11. An apparatus for constructing a reflectance map, comprising:
at least one processor; and
a memory storing instructions, which when executed by the at least one processor, cause the at least one processor to perform operations, the operations comprising:
selecting, from laser point clouds collected in a region corresponding to a to-be-constructed reflectance map, laser point clouds used for constructing a reflectance map, and selecting sample frame laser point clouds from the laser point clouds used for constructing the reflectance map;
selecting key frame laser point clouds from the sample frame laser point clouds, and determine an optimal key frame laser point cloud based on adjustment amounts of the key frame laser point clouds, each of the adjustment amounts being determined based on an amount of movement between a center position of a laser radar corresponding to a key frame laser point cloud after being merged with a second key frame laser point cloud and a center position of the laser radar corresponding to the key frame laser point cloud;
performing a global pose optimization on laser point clouds other than the optimal key frame laser point cloud in the laser point clouds used for constructing the reflectance map, to obtain a position and an Euler angle, used for constructing the reflectance map, of a center of the laser radar corresponding to each frame laser point clouds used for constructing the reflectance map; and
constructing the reflectance map based on the position and the Euler angle, used for constructing the reflectance map, of the center of the laser radar corresponding to each frame laser point clouds used for constructing the reflectance map.

12. The apparatus according to claim 11, wherein the selecting, from laser point clouds collected in a region corresponding to a to-be-constructed reflectance map, laser point clouds used for constructing a reflectance map comprises:
removing laser point clouds having a collection time with an erroneous timestamp, from the laser point clouds collected in the region corresponding to the to-be-constructed reflectance map;
removing laser point clouds having identical center positions of the laser radar, from the laser point clouds collected in the region corresponding to the to-be-constructed reflectance map; and
using the remaining laser point clouds in the laser point clouds collected in the region corresponding to the to-be-constructed reflectance map, as the laser point clouds used for constructing a reflectance map.

13. The apparatus according to claim 12, wherein the determining an optimal key frame laser point cloud based on adjustment amounts of the key frame laser point clouds comprises:
calculating an average adjustment amount of each of the key frame laser point clouds, wherein the average adjustment amount is obtained by dividing a sum of the adjustment amounts corresponding to the key frame laser point cloud by a number of other key frame laser point clouds merged with the key frame laser point clouds;

determining a key frame laser point cloud having a greatest average adjustment amount, and recalculating average adjustment amounts of remaining key frame laser point clouds other than the key frame laser point clouds having the greatest average adjustment amount; and assigning a key frame laser point clouds having a smallest average adjustment amount from the remaining key frame laser point clouds as the optimal key frame laser point cloud.

14. The apparatus according to claim 13, wherein the performing a global pose optimization on laser point clouds other than the optimal key frame laser point clouds in the laser point clouds used for constructing the reflectance map comprises:

using a position and an Euler angle of a center of the laser radar corresponding to the optimal key frame laser point cloud as the position and an Euler angle, used for constructing the reflectance map, of the center of the laser radar corresponding to the optimal key frame laser point cloud, and for each of other key frame laser point clouds other than the optimal key frame laser point cloud, performing the pose optimization to obtain a position and an Euler angle, used for constructing the reflectance map, of a center of the laser radar corresponding to each of the other key frame laser point clouds;

for each of other sample frame laser point clouds other than the key frame laser point cloud in the sample frame laser point clouds, performing the pose optimization to obtain a position and an Euler angle, used for constructing the reflectance map, of a center of the laser radar corresponding to each of the other sample frame laser point clouds; and for each of regular frame laser point clouds other than the sample frame laser point clouds in the laser point clouds used for constructing the reflectance map, performing the pose optimization to obtain a position and an Euler angle, used for constructing the reflectance map, of a center of the laser radar corresponding to each of the regular frame laser point clouds.

15. A computer readable storage medium storing a computer program, the program, when run by a processor, causing the processor to perform operations, the operations comprising:

selecting, from laser point clouds collected in a region corresponding to a to-be-constructed reflectance map, laser point clouds used for constructing a reflectance map, and selecting sample frame laser point clouds from the laser point clouds used for constructing the reflectance map;

selecting key frame laser point clouds from the sample frame laser point clouds, and determining an optimal key frame laser point cloud based on adjustment amounts of the key frame laser point clouds, each of the adjustment amounts being determined based on an amount of movement between a center position of a laser radar corresponding to a key frame laser point cloud after being merged with a second key frame laser point cloud and a center position of the laser radar corresponding to the key frame laser point cloud;

performing a global pose optimization on laser point clouds other than the optimal key frame laser point cloud in the laser point clouds used for constructing the reflectance map, to obtain a position and an Euler angle, used for constructing the reflectance map, of a center of the laser radar corresponding to each frame laser point clouds used for constructing the reflectance map; and constructing the reflectance map based on the position and the Euler angle, used for constructing the reflectance map, of the center of the laser radar corresponding to each frame laser point clouds used for constructing the reflectance map.

* * * * *